F. J. OAKES.
SPROCKET WHEEL.
APPLICATION FILED JAN. 31, 1908.
905,744.
Patented Dec. 1, 1908.
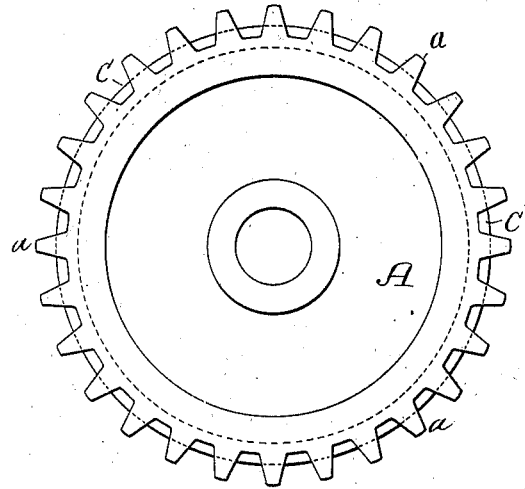
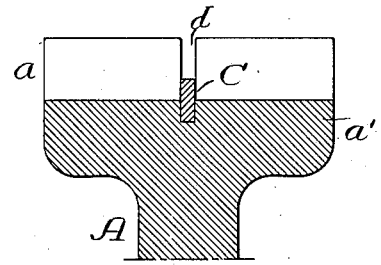
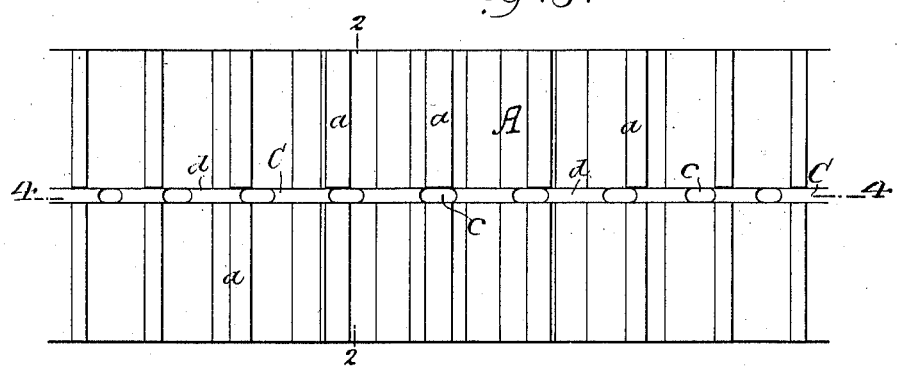
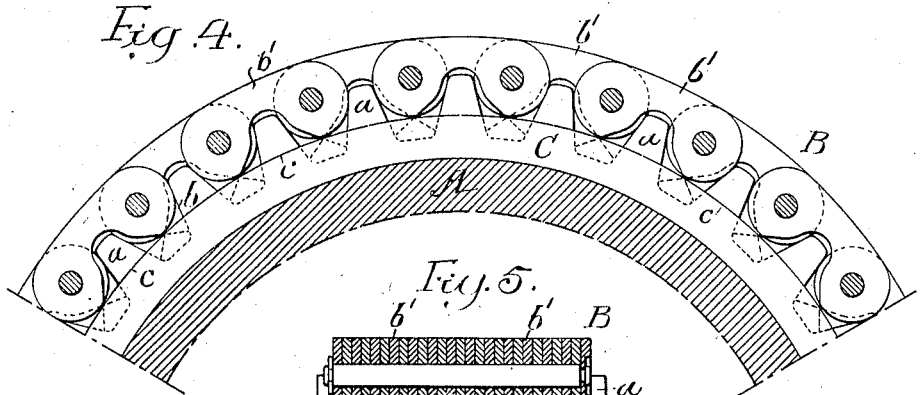
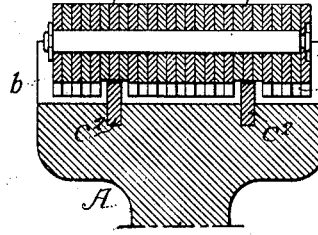
Witnesses:
William H. Rivoir.
Walter Chism.
Inventor.
Frank J. Oakes.
by his Attorneys
Howson & Howson

UNITED STATES PATENT OFFICE.

FRANK J. OAKES, OF CHICAGO, ILLINOIS, ASSIGNOR TO LINK-BELT COMPANY, OF CHICAGO, ILLINOIS, A CORPORATION OF ILLINOIS.

SPROCKET-WHEEL.

No. 905,744.  Specification of Letters Patent.  Patented Dec. 1, 1908.

Application filed January 31, 1908. Serial No. 413,675.

*To all whom it may concern:*

Be it known that I, FRANK J. OAKES, a citizen of the United States, residing in Chicago, Illinois, have invented certain Improvements in Sprocket-Wheels, of which the following is a specification.

My invention relates to certain improvements in sprocket wheels used in connection with drive chains having teeth which engage the teeth of the sprocket wheel.

The object of my invention is to dispense with the use of side flanges used in this type of wheel and to provide means for holding the chain from moving laterally.

My invention is especially applicable to the driven wheel of a chain drive, but it may be applied to both wheels without departing from my invention.

In the accompanying drawings:—Figure 1, is a side view of a sprocket wheel illustrating my invention; Fig. 2, is an enlarged sectional view on the line 2—2, Fig. 3; Fig. 3, is an enlarged face view of part of the wheel; Fig. 4, is a sectional view on the line 4—4, Fig. 3, showing the chain in position; and Fig. 5, is a transverse sectional view of a modification of my invention.

A is a sprocket wheel having teeth $a$ spaced a given distance apart. Adapted to this wheel is a chain B, made up of links, having teeth $b$ which extend into the throats between the teeth of the sprocket wheel and bear upon the sides of the teeth of the sprocket wheel, as clearly shown in Fig. 4. This is a well known form of sprocket chain driving gear.

Means must be provided to prevent the chain moving laterally on the wheels and the common method is to provide flanges at each side particularly on the driven wheel, and in some instances the driving wheel may be provided with flanges; although the chain being held in position by the flange of the driven wheel retains its position on the driving wheel. But this form of wheel is objectionable and I provide a rib C which projects from the rim $a'$ of the wheel and into the throats between the teeth of the sprocket wheel. The teeth of the chain which would ordinarily come in line with this rib are omitted and blank links $b'$ are substituted for the toothed links. This rib in the present instance is made by slotting the wheel, as at $d$, the slot cutting through the teeth $a$ and into the rim $a'$ of the wheel, as shown clearly in Fig. 2. Then a band of steel is driven into the slot $d$ encircling the wheel, as clearly shown in Fig. 1. The band C has a driven fit in the rim of the wheel and in order to insure the band remaining in position I preferably swage the band as at $c$, at the points where the band cuts through the teeth so as to wedge the band tightly in the space at the teeth.

While I preferably make the band in one piece, it may be made in as many sections as desired, depending upon the size and character of the wheel.

In Fig. 1, I have shown the rib placed in the center of the wheel, while in Fig. 5, I have shown two ribs $c^2$ placed one on each side of the center. Any number of ribs may be used according to the width of the wheel. Thus it will be seen that the chain has a recess on its under side formed by the blank links $b'$, $b'$, and that the chain while being perfectly free to travel will be prevented from moving laterally to any appreciable extent by means of the rib.

I claim:—

1. A sprocket wheel having teeth thereon and having an annular slot extending through the teeth into its rim, with a band mounted in the slot and extending into the throats between the teeth, but not extending to the ends of the teeth, whereby a toothed chain can mesh with the teeth and will be held laterally on the wheel by the band.

2. The combination of a sprocket wheel having a rib projecting into the throats between the teeth and not extending to the ends of the teeth, with a toothed drive chain extending over the teeth, the teeth of said drive chain extending into the throats between the teeth, said drive chain having blank links in line with the rib so that the rib extends into the groove thus formed retaining the chain laterally on the wheel.

3. The combination of a sprocket wheel having teeth, a rib projecting from the rim of the sprocket wheel and into the throats between the teeth, with a chain made up of a series of pivoted links, each link having projecting teeth at the pivot points so as to extend into the throats between the teeth and having a series of links without teeth in line with the annular rib forming an endless groove in the chain for the reception of the rib on the wheel.

In testimony whereof, I have signed my name to this specification, in the presence of two subscribing witnesses.

FRANK J. OAKES.

Witnesses:
A. E. MANNING,
E. G. EWART.